UNITED STATES PATENT OFFICE.

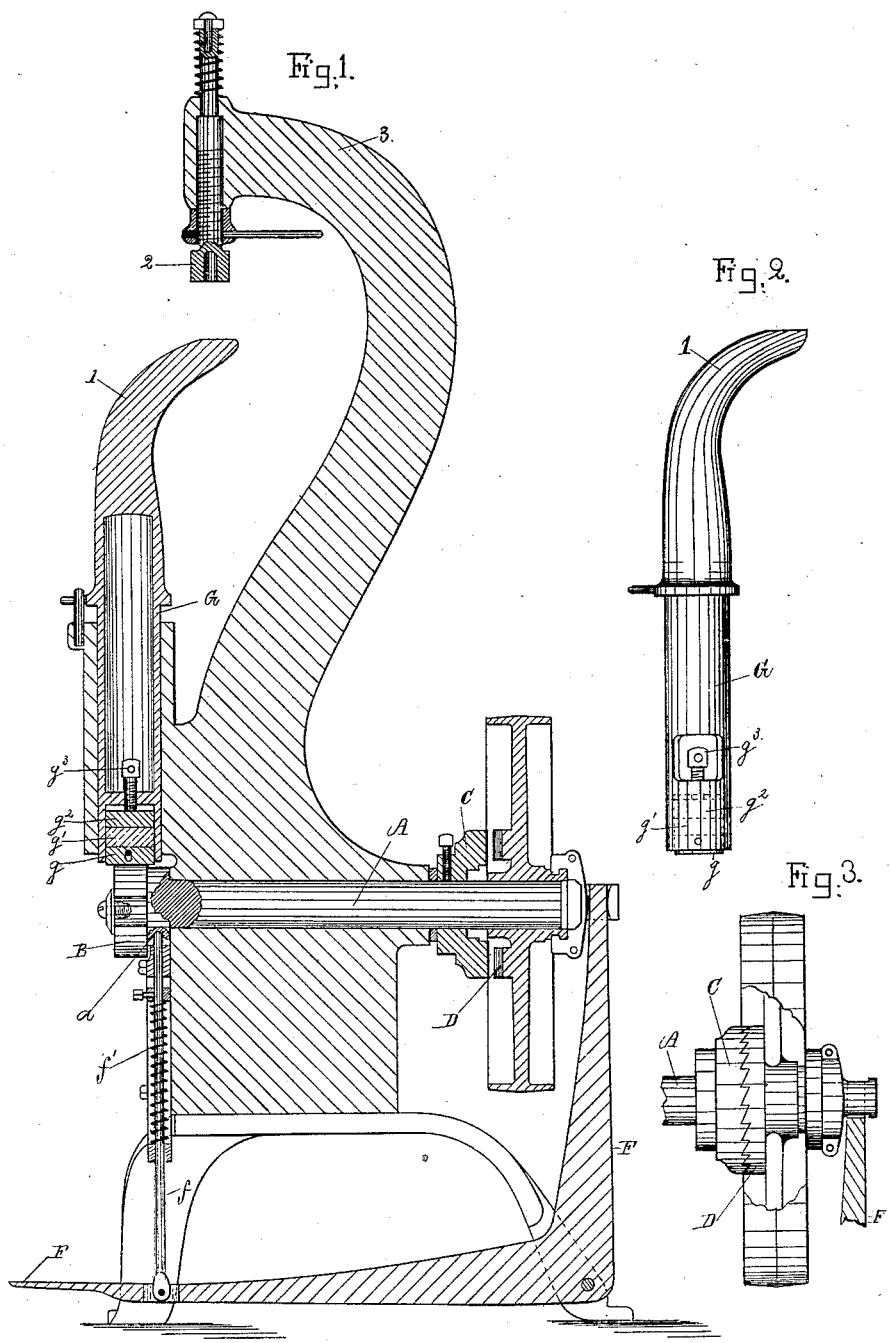

CHARLES S. FIFIELD, OF REVERE, MASSACHUSETTS.

MACHINE FOR STAMPING SOLES OF BOOTS AND SHOES.

SPECIFICATION forming part of Letters Patent No. 342,192, dated May 18, 1886.

Application filed December 7, 1885. Serial No. 184,942. (No model.)

*To all whom it may concern:*

Be it known that I, CHARLES S. FIFIELD, of Revere, in the county of Suffolk and State of Massachusetts, have invented a new and useful Mechanism, of which the following is a specification, reference being had to the accompanying drawings, in which—

Figure 1 is a central vertical section of a stamping-machine provided with my invention. Fig. 2 shows the plunger and its horn, and Fig. 3 shows the two members of the clutch in contact.

I have shown my invention as embodied in a machine for stamping the soles of boots and shoes; but it will be obvious that it may be embodied in any machine in which reciprocating motion of a head, plunger, or the like is derived from a rotary shaft, as my invention consists, mainly, in the combination of a cam-shaft and its cam with a reciprocating head (or whatever the part reciprocated by the rotary cam may be called) by means of a bearing backed up by a stout spring, the bearing being arranged in the head so that it may yield whenever the resistance to the reciprocating motion of the head is greater than the power of the spring. In most machines to which this main part of my invention is applicable it is desirable that the cam shaft shall stop after making a single revolution; and the second feature of my invention consists in a rod and a recess in the shaft or in a collar on the shaft, combined with the cam, its shaft, its clutch mechanism, and the treadle by which the moving member of the clutch is caused to engage that part of the clutch fast to the shaft, one end of the rod being withdrawn from the recess when the treadle is depressed to force the moving member of the clutch against the fast member, and the treadle being consequently held depressed by the rod until the shaft has revolved far enough to bring the recess over the rod, so that its end may again enter the recess, thereby unclutching the clutch mechanism.

In the drawings, A is the shaft; B, the cam; C, the fast member of the clutch; D, the moving member of the clutch; F, a treadle-lever adapted in any usual way to move the pulley D toward the hub C, all these parts being old and well known, and adapted to connect the shaft A with the pulley D by a motion of the treadle F, as will be clear.

The head or plunger G is shown in this instance with a horn, 1, at its upper end, adapted to enter a boot or shoe and raise it forcibly against a stamping-die mounted in the die-holder 2, which is adjustable in the usual manner in the arm 3 of the frame of the machine.

The bearing $g$ is a block of metal fitted in the head G so that it projects slightly, but yet can be forced slightly back into the head when exposed to pressure sufficient to overcome the force of the spring $g'$. This spring $g'$ is backed up by the follower $g^2$, and the force of the spring $g'$ is adjustable by the screw $g^3$.

I have shown the spring $g'$ as of rubber; but it will be clear that this is merely a matter of choice, as this part of my invention consists in the combination of the bearing and its spring with the cam and head, as shown, in order that the bearing may yield slightly whenever the force resisting the motion of the head exceeds the force of the spring.

The treadle F has a rod, $f$, connected with it, and the upper end of this rod $f$ enters a recess, $a$, in the shaft A when the treadle is in position to unclutch the clutch mechanism; but when the treadle is moved to clutch the clutch mechanism the rod $f$ is withdrawn from the recess $a$, and as shaft A then revolves with the revolving part D of the clutch mechanism the rod $f$ cannot rise, and the treadle F is consequently held in position to keep C and D clutched until the recess $a$ is brought over the rod $f$, when the rod $f$ is thrown into the recess $a$ by the treadle-spring $f'$, and the treadle is moved into position to unclutch C and D.

In stamping the soles of boots and shoes it is important that the head rise and fall as soon as the shoe is in place on the horn 1, and then remain at rest until the stamped shoe is taken off and another put on. It is also important that the pressure should not be excessive, as must necessarily be the case, (unless the die is adjusted for each shoe, which is not practical,) owing to variations in the thickness of the soles, when the horn is driven positively, and for these reasons I have shown my invention as embodied in a machine for stamping soles.

The operation is as follows: The throw of the cam being known, the die is adjusted so that its face will be at a distance from the face of the horn when at its highest, a little less than the average thickness of the soles to be stamped. The shoe is then put on the horn, the operator depresses the treadle, and the machine makes one revolution, stopping when the recess $a$ is brought over rod $f$.

If the adjustment of the die is correct, the work will be well done on a given lot of shoes, notwithstanding the unavoidable difference in thickness of their soles, because the spring $g'$ will yield when the soles of maximum thickness are stamped more than when soles of the minimum thickness are stamped, thus preventing excessive pressure on the thicker soles, while insuring sufficient pressure on the thinner ones.

The spring $g'$ does not require adjustment for different lots of shoes, as the total pressure required for a given die is about the same on all soles, whether thick or thin; but obviously it is desirable that this spring be adjustable.

What I claim as my invention is—

1. In a machine for stamping the soles of boots and shoes, the cam-shaft A, cam B, and head G, in combination with bearing $g$ and its spring $g'$, substantially as described.

2. The cam B, clutch C D, and treadle F, in combination with rod $f$ and cam-shaft A, recessed at $a$, substantially as described.

CHARLES S. FIFIELD.

Witnesses:
 EDWARD S. BEACH,
 JOHN R. SNOW.